United States Patent Office 3,474,108
Patented Oct. 21, 1969

3,474,108
CERTAIN 1,3,4-THIADIAZOLIDINE-2-THIONES
AND THEIR DERIVATIVES THEREOF
Frans Clement Heugebaert, Kontich, and Jozef Frans Willems, Wilrijk, Belgium, assignors to Gevaert-Agfa N.V., Mortsel, Belgium, a company of Belgium
No Drawing. Filed Dec. 19, 1966, Ser. No. 602,582
Int. Cl. C07d 91/62, 99/10; G03c 1/34
U.S. Cl. 260—294.8        3 Claims

ABSTRACT OF THE DISCLOSURE 1,3,4-thiadiazolidine-2-thiones are disclosed unsubstituted at the 4-position which are derived from aliphatic and pi-deficient heterocyclic aldehydes and ketones by reaction with dithiocarbazic acid or a dithiocarbazate. When alkyldithiocarbazic acids or alkyldithiocarbazates are used as the starting material, however, aliphtic, aromatic, pi-deficient and pi-excessive heterocyclic aldehydes and ketones are operative and yield the desired thiadiazolidinethiones. An alternative method of preparation involves the use of carbondisulfide and hydrazones or alkylhydrazones, wherein the alkyl-substitution on the hydrazone produces effects similar to the alkyl-substitution on the dithiocarbazic starting material. The resulting 1,3,4-thiadiazolidine-2-thiones are good halogen acceptors and are useful in photographic emulsions of the light-developable type.

The present invention relates to new 1,3,4-thiadiazolidine-2-thiones and to methods for preparing same.

According to one feature of the present invention there are provided new 1,3,4-thiadiazolidine-2-thiones corresponding to the following general formula:

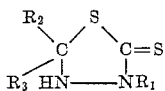

wherein:

first, $R_1$ represents hydrogen,
$R_2$ represents hydrogen or alkyl including substituted alkyl,
$R_3$ represents hydrogen, alkyl including substituted alkyl, aryl including substituted aryl or a heterocyclic or a π-deficient heterocyclic radical including a π-deficient substituted heterocyclic radical, or
$R_2$ and $R_3$ together represent the atoms necessary to close a cycloalkane ring;

or second, $R_1$ represents alkyl including substituted alkyl,
$R_2$ represents hydrogen or alkyl including substituted alkyl,
$R_3$ represents hydrogen, alkyl including substituted alkyl, aryl including substituted alkyl or a heterocyclic radical including a substituted heterocyclic radical, or
$R_2$ and $R_3$ together represent the atoms necessary to close a cycloalkane ring.

The present invention also provides methods for preparing the above new 1,3,4-thiadiazolidine-2-thiones.

The above new 1,3,4-thiadiazolidine-2-thiones can be prepared by reaction of an aldehyde or ketone with (N-alkyl)dithiocarbazic acid (hereinafter called method A) as well as by reaction of carbon disulphide with hydrazones (hereinafter called method B).

It was found that only aliphatic and π-deficient heterocyclic aldehydes and ketones form 1,3,4-thiadiazolidine-2-thiones by reaction with dithiocarbazic acid or a dithiocarbazate whereas aromatic and π-excessive heterocyclic aldehydes and ketones form azines therewith. Alkyldithiocarbazic acids or alkyl dithiocarbazates, on the contrary, form 3-alkyl-1,3,4-thiadiazolidine-2-thiones with aliphatic, aromatic as well as with heterocyclic aldehydes and ketones. The same applies to method B wherein carbon disulphide is allowed to react with hydrazones and alkylhydrazones respectively.

Method A can be represented by the following reaction scheme:

wherein $R_1$, $R_2$ and $R_3$ have the same significance as above.

Method B can be represented by the following reaction scheme:

wherein $R_1$, $R_2$ and $R_3$ have the same significance as above.

Examples of 1,3,4-thiadiazolidine-2-thiones corresponding to the general formula are:

(1) 1,3,4-thiadiazolidine-2-thione
(2) 5-methyl-1,3,4-thiadiazolidine-2-thione
(3) 5,5-dimethyl-1,3,4-thiadiazolidine-2-tthione
(4) 5-methyl-5-ethyl-1,3,4-thiadiazolidine-2-thione
(5) 5-methyl - 5 - trifluoromethyl-1,3,4-thiadiazolidine-2-thione
(6) 5,5-tetramethylene-1,3,4-thiadiazolidine-2-thione
(7) 5,5-pentamethylene-1,3,4-thiadiazolidine-2-thione
(8) 5-(2-pyridyl)-1,3,4-thiadiazolidine-2-thione
(9) 5-(3-pyridyl)-1,3,4-thiadiazolidine-2-thione
(10) 5-(4-pyridyl)-1,3,4-thiadiazolidine-2-thione
(11) 3,5,5-trimethyl-1,3,4-thiadiazolidine-2-thione
(12) 3-methyl - 5,5 - pentamethylene-1,3,4-thiadiazolidine-2-thione
(13) 3-β-hydroxyethyl - 5,5 - dimethyl-1,3,4-thiadiazolidine-2-thione
(14) 3-methyl - 5 - phenylethyl-1,3,4-thiadiazolidine-2-thione
(15) 3-methyl - 5 - (2-pyridyl)-1,3,4-thiadiazolidine-2-thione
(16) 3-methyl - 5 - (4-pyridyl)-1,3,4-thiadiazolidine-2-thione
(17) 3-methyl - 5 - phenyl-1,3,4-thiadiazolidine-2-thione
(18) 3-β-hydroxyethyl - 5 - phenyl-1,3,4-thiadiazolidine-2-thione
(19) 3-methyl - 5 - (o-chlorophenyl)-1,3,4-thiadiazolidine-2- thione
(20) 3-methyl - 5 - (o-hydroxyphenyl)-1,3,4-thiadiazolidine-2-thione
(21) 3 - methyl - 5 - (2-furyl) - 1,3,4-thiadiazolidine-2-thione.

The following illustrates more clearly how the 1,3,4-thiadiazolidine-2-thiones according to the invention are prepared.

(I) SYNTHESIS OF SOME INTERMEDIATE PRODUCTS USED

Preparation 1

Potassium N-methyl-dithiocarbazate. — 5 g. (0.108 mole) of methylhydrazine were added to 100 ml. of a 6% alcoholic potassium hydroxide solution whereupon 8.2 g. (0.108 mole) of carbon disulphide were added dropwise with stirring at room temperature. The solution was kept overnight at room temperature and then the ethanol was distilled off under reduced pressure. The residue (14.5 g.) was recrystallized from ethanol. Yield: 5 g. Melting point: 219–220° C.

Preparation 2

Isonicotinaldehyde methylhydrazone.—10.7 g. (0.1 mole) of isonicotinaldehyde were dissolved in a solution of 14.4 g. (0.1 mole) of methylhydrazine sulphate in 50 cc. of water. After having been refluxed for 2 h. the solution was made alkaline by means of ammonium hydroxide and then extracted with chloroform. After evaporation of the chloroform the residue was distilled. Yield: 8 g. (60%). Boiling point: 130°/0.25 mm. Melting point: 64–65° C. (after recrystallization from carbon tetrachloride).

Preparation 3

Picolinaldehyde methylhydrazone.—This product was prepared by a method similar to that described in Preparation 2. Boiling point: 135–140° C./12 mm. Yield: 73%.

Preparation 4

Acetone methylhydrazone.—A solution of 28.8 g. (0.2 mole) of methylhydrazine sulphate in 35 cc. of water was added to 100 cc. of acetone while stirring. After having been refluxed for 15 min. the reaction mixture was dried by means of sodium carbonate. The inorganic salts were filtered off whereupon the filtrate was evaporated. Yield: 8.5 g. (50%).

Preparation 5

Hydrocinnamaldehyde methylhydrazone.—A solution of 11.5 g. (0.88 mole) of hydrocinnamaldehyde in 100 cc. of ethanol was added to 100 cc. of an 8.8 molar solution of methylhydrazine in water. The mixture was refluxed for 2 h. whereupon the ethanol was distilled off and the aqueous layer was extracted with ether after having been cooled. The extract was dried over anhydrous sodium sulphate and the ether was evaporated. The residue was distilled. Yield: 7 g. (49%). Boiling point: 118° C./2 mm.

Preparation 6 o-Chlorobenzaldehyde methylhydrazone.—This product was prepared by a method similar to that described in Preparation 5. Boiling point: 114–119° C./1.5 mm. Yield: 31%.

Preparation 7

Benzaldehyde β-hydroxyethylhydrazone.—This hydrazone was prepared by a method similar to that described in Preparation 5. Boiling point: 162–163° C./1 mm. Yield: 73%.

(II) SYNTHESIS OF THE 1,3,4-THIADIAZOLIDINE-2-THIONES

Preparation a.—1,3,4-thiadiazolidine-2-thione

A 37% formaldehyde solution (8.1 g.—0.1 mole) was added to 100 cc. of an aqueous molar solution of ammonium dithiocarbazate. After having kept the reaction mixture for 24 h. at room temperature 1,3,4-thiadiazolidine-2-thione was precipitated by acidification with 5 N hydrochloric acid. The sticky precipitate was purified by dissolving it in 1 N sodium hydroxide and precipitating it again by addition of hydrochloric acid. Yield: 5 g. (41%). Melting point: 98° C. (with decomposition).

Preparation b.—5-methyl-1,3,4-thiadiazolidine-2-thione

This was prepared by a method similar to that described in Preparation a. Melting point: 116° C. Yield: 45%.

Preparation c.—5,5-dimethyl-1,3,4-thiadiazolidine-2-thione

Method A.—7.5 g. (0.06 mole) of ammonium dithiocarbazate were suspended with stirring in 100 cc. of acetone. Water was added dropwise until a clear solution was obtained. After having kept the reaction mixture for 5 min. at room temperature a white precipitate was formed and by boiling the reaction mixture precipitation was completed. The mixture was cooled and the precipitate was filtered off by suction. Yield: 6 g. (68%). Melting point: 120–125° C.

Method B.—380 g. (5.3 mole) of acetone hydrazone were added gradually with vigorous stirring to 500 cc. of carbon disulphide. The reaction proceeded exothermally and after having kept the mixture overnight at room temperature the crystalline product formed was filtered off by suction and washed with hexane. Yield: 162 g. (21%). Melting point: 120–125° C.

Preparation d.—5-methyl-5-ethyl-1,3,4-thiadiazolidine-2-thione

This was prepared by a method similar to that described in Preparation a. Melting point: 68° C. Yield: 27%.

Preparation e.—5-methyl-5-trifluoromethyl-1,3,4-thiadiazolidine-2-thione

This was prepared by a method similar to that described in Preparation a. Melting point: 176° C. Yield: 17%.

Preparation f.—5,5-tetramethylene-1,3,4-thiadiazolidine-2-thione

This was prepared by a method similar to that described in Preparation a. Melting point: 126° C. Yield: 49%.

Preparation g.—5,5-pentamethylene-1,3,4-thiadiazolidine-2-thione

Method A.—This method was similar to that described in Preparation a. Melting point: 153° C. Yield: 85%.

Method B.—A solution of 11.5 g. (0.11 mole) of cyclohexanone hydrazone in 30 cc. of chloroform was added to 40 cc. of carbon disulphide. The reaction mixture was kept overnight and the crystalline product formed was filtered off by suction and washed with n-hexane. Yield: 15 g. (80%). Melting point: 156° C. (After recrystallization from chloroform/n-hexane 1:1.)

Preparation h.—5-(4-pyridyl)-1,3,4-thiadiazolidine-2-thione

This was prepared by method B described in Preparation g, starting from isonicotinaldehyde hydrazone. Yield: 86%. Melting point: 138–140° C.

Preparation i.—5-(2-pyridyl)-1,3,4-thiadiazolidine-2-thione

This was prepared by method B described in Preparation g, starting from picolinaldehyde hydrazone. Yield: 98%. Melting point: 118–125° C.

Preparation j.—5-(3-pyridyl)-1,3,4-thiadiazolidine-2-thione

This was prepared by method B described in Preparation g starting from nicotinaldehyde hydrazone. Yield: 85%. Melting point: 120–125° C.

Preparation k.—3,5,5-trimethyl-1,3,4-thiadiazolidine-2-thione

Method A.—A solution of 14 g. of methyldrazine sulphate (0.1 mole) in 40 cc. of water was made alkaline by addition of 60 ml. of 5 N sodium hydroxide whereupon 7.6 g. (0.1 mole) of carbon disulphite were added dropwise with vigorous stirring. Stirring was continued until a completely clear solution was obtained. To the solution of sodium N-methyl-dithiocarbazate thus obtained 10 cc. (0.1 mole) of acetone were added whereupon the solution was kept overnight at room temperature and then neutralized by addition of hydrochloric acid (pH 7). Yield: 5 g. (31%). Melting point: 78–79° C.

Method B.—This method was similar to that described in Preparation c, method B starting from acetone methylhydrazone. Yield: 56%. Melting point: 78–79° C.

Preparation l.—3-methyl-5,5-pentamethylene-1,3,4-thiadiazolidine-2-thione

Method A.—This method was similar to that described in Preparation k, method A, starting from cyclohexanone. Yield: 35%. Melting point: 123–124° C. (after recrystallization from hexane-chloroform).

Method B.—This method was similar to that described in Preparation k, method B, starting from cyclohexanone methylhydrazone. Yield: 85%. Melting point: 123–124° C.

Preparation m.—3-methyl-5-phenylethyl-1,3,4-thiadiazolidine-2-thione

This was prepared by a method similar to that described in Preparation c, method B, starting from hydrocinnamaldehyde methylhydrazone. Yield: 90%. Melting point: 60° C.

Preparation n.—3-methyl-5-phenyl-1,3,4-thiadiazolidine-2-thione

Method A.—This method was similar to that described in Preparation k, method A, starting from benzaldehyde. Yield: 14%. Melting point: 96° C.

Method B.—This method was similar to that described in Preparation c, method B, starting from benzaldehyde methylhydrazone. Yield: 78%. Melting point: 96° C. (after recrystallization from ethanol).

Preparation o.—3-methyl-5-(o-chlorophenyl)-1,3,4-thiadiazolidine-2-thione

This was prepared by a method similar to that described in Preparation c, method B, starting from o-chlorobenzaldehyde methylhydrazone. Yield: 30%. Melting point: 170° C.

Preparation p.—3-methyl-5-(o-hydroxyphenyl)-1,3,4-thiadiazolidine-2-thione

This was prepared by a method similar to that described in Preparation g, method B, starting from salicylaldehyde methylhydrazone. Yield: 67%. Melting point: 140° C.

Preparation q.—3-methyl-5-(2-furyl)-1,3,4-thiadiazolidine-2-thione

This was prepared by a method similar to that described in Preparation g, method B, starting from 2-furaldehyde methylhydrazone. The mixture should be heated gently to start the reaction. Yield: 52%. Melting point: 120° C. (after recrystalliation from carbon tetrachloride).

Preparation r.—3-methyl-5-(2-pyridyl)-1,3,4-thiadiazolidine-2-thione

This was prepared by a method similar to that described in Preparation c, method B, starting from picolinaldehyde methylhydrazone. The reaction proceeded very exothermally. Yield: 73%. Melting point: 97° C. (After recrystallization from chloroform/carbon tetrachloride (1:1).)

Preparation s.—3-methyl-5-(4-pyridyl)-1,3,4-thiadiazolidine-2-thione

This was prepared by a method similar to that described in Preparation g, starting from isonicotinaldehyde methylhydrazone. Yield: 73%. Melting point: 116° C.

Preparation t.—3-hydroxyethyl-5,5-dimethyl-1,3,4-thiadiazolidine-2-thione

To a solution of 11.6 g. (0.1 mole) of acetone hydroxyethylhydrazone in 20 cc. of chloroform 20 cc. of carbon disulphide were added with stirring. The reaction mixture was kept overnight at room temperature and then evaporated. The residue was a viscous oil that decomposed on distilling. Yield: 5 g. (25%).

Preparation u.—3-hydroxyethyl-5-phenyl-1,3,4-thiadiazolidine-2-thione

The method followed was similar to that described in Preparation c, method B, starting from benzaldehyde hydroxyethylhydrazone. Yield: 65%. Melting point: 90° C. (after recrystallization from chloroform/carbontetrachloride 1:1).

As is illustrated by the following example the 1,3,4-thiadiazolidine-2-thiones are interesting halogen acceptors for use in light-developable radiation sensitive silver halide emulsion layers, the principle of which has been described in German patent specification No. 872,155.

Light-developable silver halide materials for direct recording are radiation-sensitive materials in which a visible image can be obtained, after an exposure to a high intensity source of radiation has been initially utilized to form a latent image, by an additional exposure to a radiation of lower intensity such as diffuse daylight or artificial light. The secondary exposure, also called latensification, is an overall exposure, including exposing the areas in which the initial latent image was formed as well as the surrounding background to an additional amount of radiation.

EXAMPLE

A light-sensitive photographic silver bromide emulsion of the light-developable type i.e. that mainly forms a internal latent image and only to a little extent an external latent image is prepared by conversion of a silver chloride emulsion into a silver bromide emulsion. Said silver bromide emulsion is prepared so that an amount of silver bromide equivalent to 120 g. (0.7 mole) of silver nitrate is present per kg. of emulsion. The usual emulsion ingredients and coating aids are incorporated into the emulsion, and in addition thereto an orthochromatic sensitizing agent and 8 g. of cadmium bromide per kg. of emulsion for reducing the background density.

The emulsion obtained is divided into two aliquot portions. To one of these emulsion portions 40 ccs. of a 1% by weight solution in a suitable solvent of -β-hydroxyethyl-phenyl-1,3,4-thiadiazolidine-2-thione is added per kg. of emulsion.

The two emulsion portions are coated on conventional photographic paper supports in such a way that an amount of silver halide equivalent to 4 g. of silver nitrate is present per sq. m. of light-sensitive material.

The two light-sensitive materials obtained are then subjected to the following identical successive treatments:

(1) They are exposed in a flash-sensitometer "Mark VI" of Edgarton, Germeshausen en Grier for $10^{-4}$ sec. through a step-wedge with a constant of 0.3.

(2) The exposed materials are photo-developed for 15 min. by exposure to ordinary office fluorescent lights with a total light-intensity of 240 Lux whereupon the density of the image-areas and non-image areas is measured in a MacBeth reflection densitometer. The difference between the maximum density (=image density) and minimum density (=background density) ΔD of the two materials is listed in the table hereinafter.

(3) In order to determine the stability of the image, the difference between the maximum and minimum density $\Delta D_1$ is measured again after latensification in analogous circumstances as in (2) but for 10 hours. The differences $\Delta D_1$ are also listed in the table below.

Moreover, in the table below the number of steps of the wedge that are recorded is also listed. This number is a measure of the relative sensitivity of the two radiation-sensitive photo-developable materials.

TABLE

| Material: | Halogen-acceptor | ΔD | ΔD₁ | Number of steps |
|---|---|---|---|---|
| 1 | None | 0.12 | 0.09 | 6 |
| 2 | Compound 18 | 0.37 | 0.21 | 6 |

What we claim is:

1. A 1,3,4-thiadiazolidine-2-thione corresponding to the formula:

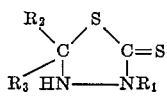

and selected from the group consisting of, first, a compound wherein:

$R_1$ represents hydrogen, $R_2$ is selected from the group consisting of hydrogen and lower alkyl, and $R_3$ is selected from the group consisting of hydrogen, lower alkyl and pyridyl, and $R_2$ and $R_3$ taken together represent cyclopentyl and cyclohexyl; and second, a compound wherein $R_1$ is selected from the group consisting of lower alkyl, $R_2$ is selected from the group consisting of hydrogen and lower alkyl, $R_3$ is selected from the group consisting of hydrogen, lower alkyl, phenyl, furyl, and pyridyl, and $R_2$ and $R_3$ taken together represent cyclopentyl and cyclohexyl.

2. A compound as claimed in claim 1 wherein $R_3$ is 2-pyridyl.

3. A compound as claimed in claim 1 wherein $R_3$ is 4-pyridyl.

References Cited

Baron et al.: J. Org. Chem., vol. 23, pp. 1021–23 (1958), QD 241 J–6.

Grashey et al.: J. Org. Chem., vol. 30, pp. 74–79 (1965), QD 241 J–6.

Bambas: The Chemistry of Heterocyclic Compounds, Interscience, pp. 120–123 (1952), QD 400 B3.

Baron et al.: Chem. Abstracts (II), vol. 53, par. 15,065 (1959).

Kazakov et al.: Chem. Abstracts (I), vol. 55, par. 6483 (1961).

JOHN N. RANDOLPH, Primary Examiner

A. L. ROTMAN, Assistant Examiner

U.S. Cl. X.R.

96—109; 260—296, 306.7, 566